June 12, 1928.

J. C. BLACK ET AL 1,673,490

APPARATUS FOR CONTROLLING PRESSURE

Filed June 28, 1927

INVENTORS
JOHN C. BLACK.
JOHN A. COWARD.
BY
Marvin L. Chappell
ATTORNEY

Patented June 12, 1928.

1,673,490

UNITED STATES PATENT OFFICE.

JOHN C. BLACK, OF LOS ANGELES, AND JOHN R. COWARD, OF WATSON, CALIFORNIA.

APPARATUS FOR CONTROLLING PRESSURE.

Application filed June 28, 1927. Serial No. 202,105.

Our invention relates to a new and improved apparatus for controlling pressure, and while not necessarily confined thereto, it more specifically refers to a controlling device to be used in cracking systems, where high pressures are maintained.

The object of the invention is to provide a device of the above mentioned character having a high sensitiveness and a long life in operation.

The super-sensitiveness at high pressures is attained by the controlling action of the spring on the inner and outer stem and by the super-control of the hand operated outer-stem over the spring operated inner-stem.

The lengthening of the life of operation is attained through the special construction of the seat with jet shaped opening and through the stream line design of the valve, reducing the resistance to the flow and minimizing the cutting action of said flow. In addition to the above the seat and valve are made of special non-corrosive and non-erosive material such as ascoloy, stellite, chromium steel, chromium plated steel and the like.

Reference is to be had to the accompanying drawings, forming a part of this specification, in which similar characters of reference indicate corresponding parts in all the figures, and in which—

Figure 1:
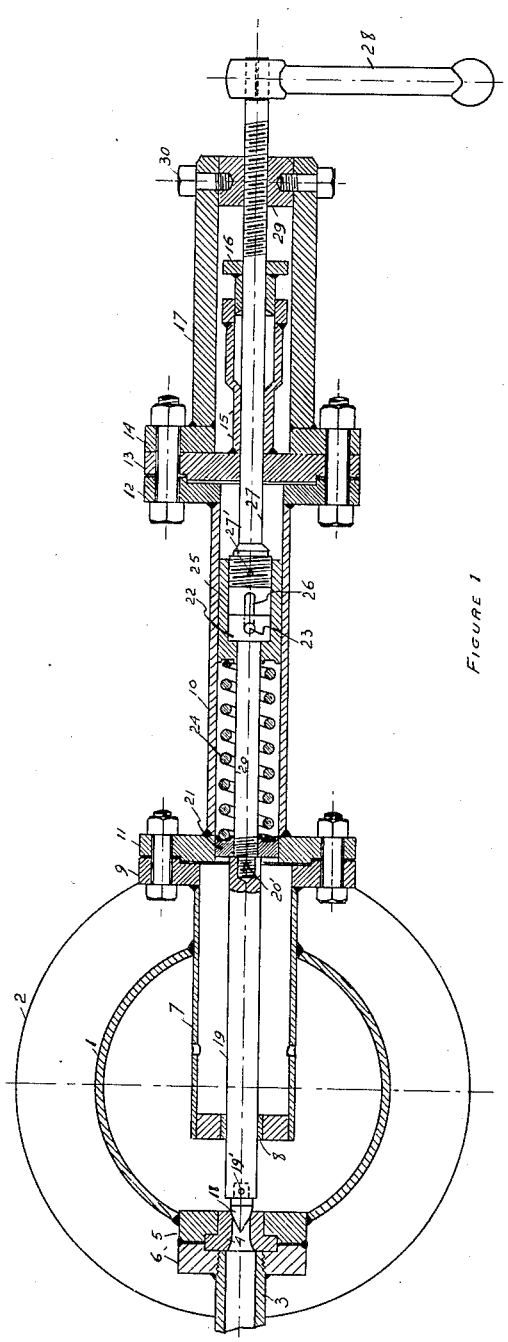
Figure 2:
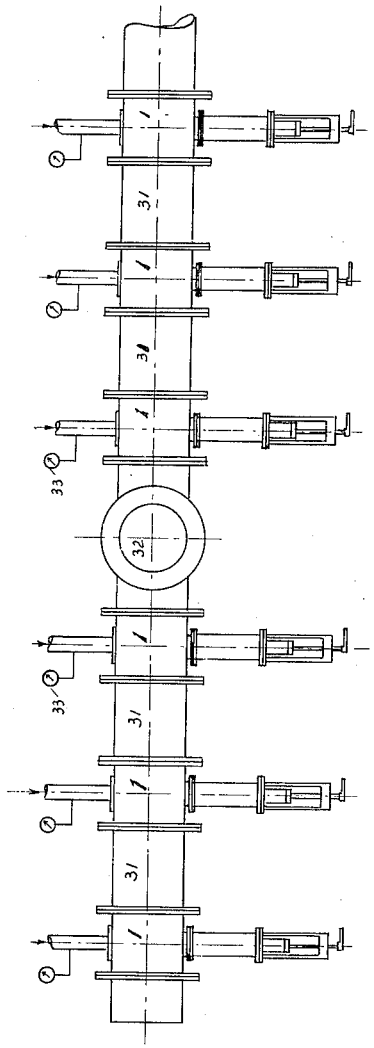

Figure 1 is a horizontal sectional view through a preferred embodiment of the device, and Figure 2 is a top view of the arrangement of a series of valves as found in operation.

Described more in detail, Figure 1 shows a cylindrical valve body 1 having an outlet at each end with a flange 2, an inlet pipe 3, a removable seat 4, held in place between two abutting flanges 5 and 6, of which flange 5 is welded to the valve body 1 and flange 6 with inlet pipe 3 is welded to said flange 5. Opposite the inlet is shown a cylindrical neck 7 extending in the valve body 1 having a valve guide 8 and a flange 9 at its outer end. The cylindrical bonnet 10 has flanges 11 and 12 of which flange 12 is bolted to the flanges 13 and 14. Stuffing box 15 having gland 16 is welded to flange 13. Yoke 17 is welded to flange 14 and has a stem nut 29 at the other end which is secured by set screws 30. Opposite the seat 4 is valve 18 which is tightly fitted into the valve stem 19 and locked with pin 19'. The spring stem 20 is threaded and screwed in the valve stem 19 and secured by pin 20'. Spring stem 20 has a spring cup 21 attached to it, which fits easily in the cylindrical bonnet 10. The opposite end of spring stem 20 has an internal piston 22 fitting in an external piston 25 and having guiding pins 23. The spring 24 is held in place between the spring cup 21 and the external piston. The outer stem 27 is threaded at both ends, and has the external piston 25 attached to it with thread and secured by pin 27'. Said external piston 25 is provided with slots 26 to direct the position of the valve stem 19. The outer stem 27 extending through stuffing box 15 and gland 16 is held in position by stem nut 29 and is operated by handle 28.

Figure 2 shows a top view of an arrangement of six valves as used in cracking systems. The valves are all connected through spools 31 of the same diameter as the valve body 1, thus making a straight passage to the common vapor outlet 32. All inlet lines 3 are provided with a suitable gauge 33 showing the pressure to be maintained in the cracking system.

Having thus described the invention, we claim as new and desire to secure by Letters Patent:

1. A pressure controlling device comprising a cylindrical flanged body, having an inlet on the side, an outlet at each end and a cylindrical neck opposite the inlet, the neck extending internally in the body, having a valve stem guide on the inside and a flange on the outside, which flange is connected to a bonnet with stuffing box and yoke, said cylindrical flanged body having a stem comprising an inner and outer stem connected by a movable and sensitive coupling, consisting of an internal piston at the connecting end of the inner stem and an external piston at the connecting end of the outer stem, both pistons commanded by a spring, said spring held in place between a fixed spring cup on the inner stem and the bottom of the external piston of the outer stem, the inner and outer stem being kept in line in the cylindrical bonnet by the spring cup and the pistons.

2. A pressure controlling device as in claim 1, having a stem comprising an inner stem and an outer stem, the inner stem consisting of a valve, a valve stem and a spring stem, the spring stem having a fixed spring cup at the valve stem and a solid piston at the other end, said piston having guiding pins fitting slidingly in slots of the external piston of the outer stem and the spring stem having a spring held in place between the spring cup and this external piston; the said outer stem having an external piston with slots at the connecting end and threads and handle at the operating end, the inner and outer stems are kept in line by the spring cup and the pistons sliding in the cylindrical bonnet.

3. A pressure controlling device comprising a flanged body having an inlet at the side thereof and outlets at each end, a cylindrical neck opposite the inlet and extending into the body, a valve stem guide on the inside and a flange on the outside of said neck, a bonnet having a stuffing box and yoke, said bonnet being connected to said flange, a valve seat disposed in said inlet, a valve stem extending through said neck, bonnet, stuffing box and yoke, a valve attached to said stem, spring means surrounding said stem in said bonnet and means to control the operation of said spring and regulate said valve.

4. A pressure controlling device comprising a flanged body having an inlet at the side thereof and outlets at each end, a cylindrical neck opposite the inlet and extending into the body, a valve stem guide on the inside and a flange on the outside of said neck, a bonnet having a stuffing box and yoke, said bonnet being connected to said flange, a valve seat disposed in said inlet and having a tapered opening, a valve stem extending through said neck, bonnet, stuffing box and yoke, a stream-line-shaped valve attached to said stem, spring means surrounding said stem in said bonnet and means to control the operation of said spring and regulate said valve.

In testimony whereof we affix our signatures.

JOHN C. BLACK.
JOHN R. COWARD.